United States Patent
Hozumi et al.

(10) Patent No.: US 8,445,810 B2
(45) Date of Patent: May 21, 2013

(54) LASER WELDING APPARATUS

(75) Inventors: Hisashi Hozumi, Tokyo (JP); Yutaka Togasawa, Kanagawa (JP); Kenji Matsuzaki, Tokyo (JP); Mitsuaki Shimamura, Saitama (JP); Satoshi Okada, Tokyo (JP); Wataru Kono, Kanagawa (JP); Masaki Yoda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 301 days.

(21) Appl. No.: 12/903,855

(22) Filed: Oct. 13, 2010

(65) Prior Publication Data
US 2011/0024402 A1  Feb. 3, 2011

Related U.S. Application Data

(63) Continuation-in-part of application No. PCT/JP2009/001670, filed on Apr. 10, 2009.

(30) Foreign Application Priority Data

Apr. 14, 2008  (JP) ................................. 2008-104846

(51) Int. Cl.
*B23K 26/20*  (2006.01)
(52) U.S. Cl.
USPC .................................................. 219/121.63
(58) Field of Classification Search
USPC ............. 219/121.63, 121.64, 121.61, 121.81, 219/121.83, 137.2, 137.31, 137.7, 137.71, 219/75
See application file for complete search history.

(56) References Cited

U.S. PATENT DOCUMENTS 5,925,268 A * 7/1999 Britnell .................... 219/121.63
2002/0036190 A1  3/2002 Tamura et al.

FOREIGN PATENT DOCUMENTS

| EP | 1580768 A2 | * | 9/2005 |
| GB | 1489125 | * | 10/1977 |
| JP | 62-165071 U | | 10/1987 |
| JP | 04-361887 A | | 12/1992 |
| JP | 07-040069 A | | 2/1995 |
| JP | 11-147187 A | * | 6/1999 |
| JP | 2000-117466 A | * | 4/2000 |
| JP | 2002-103077 A | | 4/2002 |
| JP | 2005-081403 A | | 3/2005 |
| JP | 2005-161385 A | * | 6/2005 |
| JP | 2005-279720 A | | 10/2005 |

OTHER PUBLICATIONS

Translation of International Preliminary Report on Patentability of PCT/JP2009/001670, dated Dec. 9, 2010, 5 pages.

* cited by examiner

*Primary Examiner* — Geoffrey S Evans
(74) *Attorney, Agent, or Firm* — Foley & Lardner LLP (57) ABSTRACT

According to one embodiment, a laser welding apparatus has a laser irradiation head that is arranged in an outer frame and is divided inside into a light source side and an irradiation side by a partitioning member. The apparatus also has a gas jet nozzle that is formed so as to irradiate a portion to be welded with the laser light and jet the inert gas to the portion to be welded; and a welding wire feed pipe that sequentially feeds a welding wire. The apparatus also has a welding wire contact mechanism that includes a measuring means for measuring a distance between the extremity of the irradiation side and the extremity of the welding wire, and is formed so that the extremity of the welding wire is brought into contact with and pressed against the portion to be welded by an elastic member.

11 Claims, 10 Drawing Sheets

LASER WELDING APPARATUS

CROSS REFERENCES TO RELATED APPLICATIONS

This application is a continuation-in-part (CIP) application based upon the International Application PCT/JP2009/001670, the International Filing Date of which is Apr. 10, 2009, the entire content of which is incorporated herein by reference, and claims the benefit of priority from the prior Japanese Patent Application No. 2008-104846, filed in the Japanese Patent Office on Apr. 14, 2008, the entire content of which is incorporated herein by reference.

BACKGROUND

Embodiments described herein relate generally to a laser welding apparatus and a laser welding method using the apparatus.

It is generally known that when a reactor structure or other members are damaged, repairs are made to restore soundness by using laser welding.

In an example of such laser welding, a large amount of gas is blown to around the portion to be melted to establish a locally dry condition in the water, and the dry metal surface is irradiated with laser light so that the base metal and the extremity of the welding wire are melted to mend the defective portion.

As disclosed in Japanese Patent Application Laid-Open Publications No. 2002-103077 and No. 2005-279720, the entire contents of which are incorporated herein by reference, there are known laser welding apparatuses that are capable of laser welding in the water.

In the laser welding mentioned above, it may be difficult to maintain a constant distance between the laser welding head and the portion to be welded in cases such as when the already-existing welded structure has a large error from its drawings, when the portion to be welded includes a curved surface, and when the portion to be welded has a difference in level. In such cases, there has been the problem that the laser welding head and the portion to be welded no longer have a stable positional relationship for high-quality welding.

BRIEF SUMMARY OF THE INVENTION

The present invention has been achieved to solve the foregoing problem. It is an object of the present invention to perform welding while maintaining a constant distance between the extremity of the laser irradiation head of the laser welding apparatus and the portion to be welded as well as keeping the extremity of the welding wire in contact with the portion to be welded.

In order to achieve the object described above, there is presented a laser welding apparatus comprising: an outer frame; a laser irradiation head of tubular shape that is arranged in the outer frame and is divided inside into a light source side and an irradiation side by a partitioning member having a light transparency and reflectivity, an opening being formed in an extremity of the irradiation side, an optical member for collecting laser light being arranged on the light source side, the irradiation side being intended for irradiation of the laser light; a gas supply pipe that is coupled to a lateral side of the irradiation side to supply inert gas into an interior of the irradiation side; a gas jet nozzle that is coupled in series to the opening in the extremity of the irradiation side, and is formed so as to irradiate a portion to be welded with the laser light and jet the inert gas to the portion to be welded; a welding wire feed pipe that sequentially feeds a welding wire so that an extremity of the welding wire comes into contact with the portion to be welded; and a welding wire contact mechanism that includes a measuring means for measuring a distance between the extremity of the irradiation side and the extremity of the welding wire, and is formed so that the extremity of the welding wire is brought into contact with and pressed against the portion to be welded by an elastic member.

There is also presented a laser welding method comprising: a pre-weld traveling step of moving a laser welding apparatus along a portion to be welded of an article to be welded by using a driving apparatus to measure a distance between an extremity of a laser irradiation head of the laser welding apparatus and the portion to be welded; after the pre-weld traveling step, a moving route correcting step of correcting, based on the distance measured by the pre-weld traveling step, a moving route of the laser welding apparatus so as to make the distance constant; and, after the moving route correcting step, a laser irradiation step of irradiating the portion to be welded with laser light for welding by using the laser welding apparatus while controlling the driving apparatus based on the result of correction of the moving route correcting step.

There is also presented a laser welding method comprising: a distance measuring step of moving a laser welding apparatus along a portion to be welded of an article to be welded to measure a distance between an extremity of a laser irradiation head of the laser welding apparatus and the portion to be welded; and a moving route correcting step of correcting a moving route of the laser welding apparatus so as to make the distance constant based on the measured distance, the distance measuring step and the moving route correcting step being performed in parallel with a laser irradiation step of irradiating the portion to be welded with laser light for welding by using the laser welding apparatus while controlling the driving apparatus based on the result of correction of the moving route correcting step.

According to the present invention, it is possible to perform welding while maintaining a constant distance between the extremity of the laser irradiation head of the laser welding apparatus and the portion to be welded as well as keeping the extremity of the welding wire in contact with the portion to be welded.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION

Hereinafter, embodiments of the laser welding apparatus according to the present invention will be described with reference to the drawings.

First Embodiment

Figure 1:
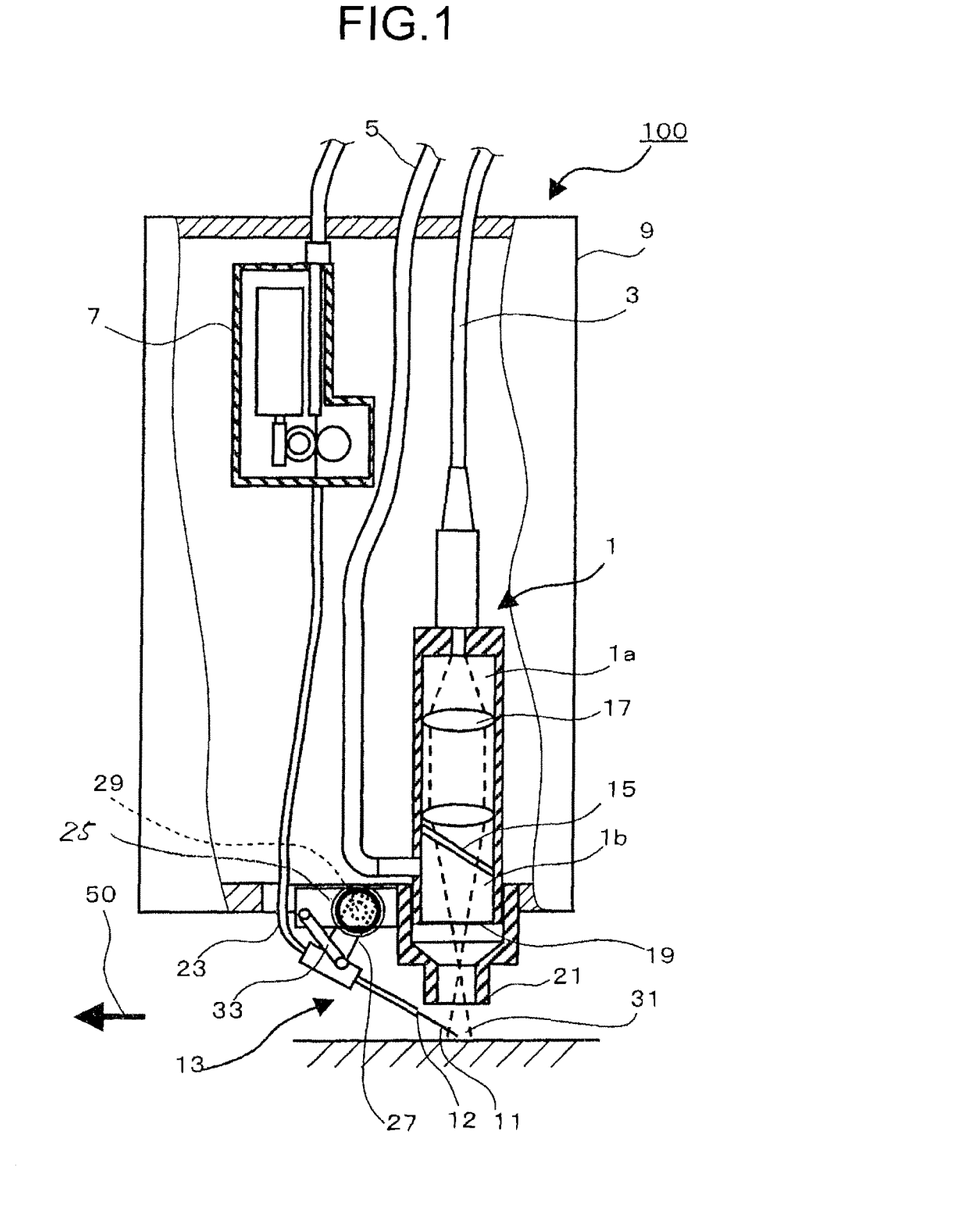
FIG. 1 is a partly-broken partial sectional front view showing a laser welding apparatus body of a first embodiment according the present invention.

A first embodiment of the laser welding apparatus according to the present invention will be described with reference to FIG. 1. FIG. 1 is a partly-broken partial sectional front view showing a laser welding apparatus body 100 which is an essential part of the laser welding apparatus according to the present embodiment. Description will initially be given of the configuration of the laser welding apparatus body 100 according to the present embodiment.

The laser welding apparatus body 100 of the present embodiment includes: a laser irradiation head 1; an optical fiber 3 which supplies laser light to the laser irradiation head 1; a gas supply pipe 5 which supplies inert gas to the laser irradiation head 1; a welding wire feed mechanism 7 which feeds a welding wire 11 into a portion to be welded 31; and an outer frame 9 which is formed to cover the components so as to prevent intrusion of water inside. The laser welding apparatus body 100 further has a welding wire contact mechanism 13 which brings the welding wire 11 into contact with the portion to be welded 31 with a predetermined pressing force.

The laser irradiation head 1 has a cylindrical shape, for example. The interior of the laser irradiation head 1 is divided into a light source side 1a and an irradiation side 1b by a partitioning member 15 of flat shape which is made of glass or the like and has a light transparency and reflectivity. The partitioning member 15 is fixed so that its surface forms a predetermined angle to the direction of the laser optical axis.

The optical fiber 3 for supplying laser light is connected to the end of the laser irradiation head 1 on the light source side 1a. A plurality of optical elements 17 such as a lens are arranged in the interior of the laser irradiation head 1 on the light source side 1a. The optical elements 17 have the function of adjusting the focus of the laser light to the portion to be welded 31 of an article to be welded, for example, and are configured so as to transmit a predetermined wavelength band of the laser light supplied from the optical fiber 3.

An opening 19 intended for laser light irradiation is formed in the end of the irradiation side 1b. A gas jet nozzle 21 is coupled to the outer side of the opening 19 in series.

The gas supply pipe 5 is laid from outside the laser welding apparatus body 100 into the outer frame 9, and is connected to the lateral side of the laser irradiation head 1 on the irradiation side 1b. Inert gas supplied from the gas supply pipe 5 is blown against the partitioning member 15 arranged on the irradiation side 1b, and is jetted from the gas jet nozzle 21 to the portion to be welded 31. The partitioning member 15 is inclined so that the inert gas that is passed and supplied from the lateral side of the laser irradiation head 1 in a direction substantially perpendicular to the laser optical axis is turned in direction and supplied toward the gas jet nozzle 21 in the direction of the laser optical axis.

The gas jet nozzle 21 is configured to allow the irradiation of the laser light and the jetting of the inert gas.

The welding wire feed mechanism 7 is arranged next to the laser irradiation head 1 in the outer frame 9, and is configured to feed the extremity of the welding wider 11 into the portion to be welded 31 at a predetermined rate. A welding wire feed pipe 23 is extended from the welding wire feed mechanism 7 to near the portion to be welded 31 of the article to be welded. The extremity of the welding wire 11 is passed through the welding wire feed pipe 23 and fed out of the welding wire feed pipe 23 from a wire outlet 12 of the welding wire feed pipe 23 so that it comes into contact with the portion to be welded 31.

The preferred rate at which the welding wire feed mechanism 7 feeds the welding wire 11 is about 1.7 v or 70% higher than the traveling velocity (v) of the laser welding apparatus body 100 during welding.

The welding wire feed pipe 23 located near the portion to be welded 31 extends in a direction at a predetermined inclination from the direction of the laser optical axis.

The welding wire contact mechanism 13 includes: a rotation sensor 25 which can detect an angle of rotation; a first support member 27 which supports the welding wire feed pipe 23 and is made of, for example, a metal material; and a first elastic member 33 which is connected at one end to the first support member 27.

The rotation sensor 25 is arranged on the outer frame 9 near the gas jet nozzle 21 so that its rotating shaft 29 extends in a direction perpendicular to the laser optical axis.

The first support member 27, which supports the welding wire feed pipe 23 whose extremity extends to near the portion to be welded 31, is connected to, for example, an end of the rotating shaft 29. The first support member 27 is a flat plate of rectangular shape, for example. One of the narrow sides of the first support member 27 is attached to the end of the rotating shaft 29 so as to be perpendicular to the direction of the rotating shaft 29. The other narrow side is coupled to the welding wire feed pipe 23, whereby the welding wire feed pipe 23 is supported.

Rotating the rotating shaft 29 of the rotation sensor 25 causes rotation of the first support member 27. More specifically, the extremity of the welding wire feed pipe 23 rotates about the rotating shaft 29, in the vicinity of the portion to be welded 31. The rotation of the rotating shaft 29 therefore causes rotation of the extremity of the welding wire 11 that is fed out of the welding wire feed pipe 23. The extremity of the welding wire 11 moves along a plane that is perpendicular to the direction of the rotating shaft 29 of the rotation sensor 25 and includes the laser optical axis.

Strictly speaking, the extremity of the welding wire 11 rotates with the rotation of the rotating shaft 29. The movement may be considered as a fluctuation in the direction of the laser optical axis, however, because the amount of rotation (amount of movement) is small. In the following description of the present embodiment, the rotating operation of the welding wire 11 will be considered as a fluctuation.

The welding wire feed pipe 23 in the vicinity of the portion to be welded 31 is coupled to the outer frame 9 near the rotation sensor 25 through the first elastic member 33 such as a compressed spring or rubber. The extremity of the welding wire 11 is brought into contact with the portion to be welded 31 of the article to be welded with a predetermined pressing force from the reaction force of the first elastic member 33 compressed. The pressing force makes it possible to keep the extremity of the welding wire 11 closely and constantly in contact with the portion to be welded 31.

Using the rotation sensor 25, the welding wire contact mechanism 13 can measure the distance between the extremity of the laser irradiation head 1 and the extremity of the welding wire 11 which is located in the vicinity of the portion to be welded 31.

The welding wire contact mechanism 13 can also measure the distance from the extremity of the laser irradiation head 1 to the extremity of the welding wire 11 (the portion to be welded 31) based on the angle of rotation detected by the rotation sensor 25 and a geometric calculation.

In a welding operation, the laser welding apparatus body 100 of the present embodiment travels, for example, in the direction shown by the arrow 50 in FIG. 1. In the vicinity of the portion to be welded 31, the direction, in which the welding wire 11 extends away from the portion to be welded 31, is set at an acute angle to the direction of the arrow 50, for example. If the portion to be welded 31 has an unexpected stepped part such as a protrusion, the stepped part then comes into contact with a lateral part of the welding wire 11.

In such a situation that the lateral part of the welding wire 11 is in contact with the stepped part, the pressing force that the extremity of the welding wire 11 applies to the portion to be welded 31 makes the extremity of the welding wire 11 follow the configuration of the stepped part. The extremity of the welding wire 11 and the portion to be welded 31 are thereby kept in contact with each other.

A driving apparatus (not shown) of the laser welding apparatus body 100 has a sideward drive unit that is intended for driving in the direction of the arrow 50 shown in FIG. 1, and an axial drive unit that is intended for driving in the direction of the laser optical axis.

Next, the optical path of the laser light and the flow path of the inert gas will be described.

The laser light supplied from the optical fiber 3 is supplied to the light source side 1a of the laser irradiation head 1. The laser light is transmitted through the plurality of optical elements 17 arranged on the light source side 1a. The laser light transmitted through the optical elements 17 passes through the partitioning member 15, and it is supplied to the irradiation side 1b, and sent to the gas jet nozzle 21. In the meantime, the inert gas passes through the gas supply pipe 5 and is supplied to the irradiation side 1b of the laser irradiation head 1. The inert gas supplied to the irradiation side 1b is blown against the partitioning member 15 and directed to the gas jet nozzle 21.

Here, in the gas jet nozzle 21, the irradiation of the laser light and the jetting of the inert gas take place in parallel. The laser welding apparatus body 100 thereby performs welding on the portion to be welded 31.

Next, a method of welding using the laser welding apparatus of the present embodiment will be described.

As a preparation to the welding operation, an optimum distance for welding is determined in advance in terms of the distance between the extremity of the laser irradiation head 1 and the portion to be welded 31. With reference to the optimum distance for welding, weldable distances in both directions where the extremity of the laser irradiation head 1 approaches and gets away from the portion to be welded 31, i.e., the range of weldable distances is also determined in advance. The weldable range here refers to where the extremity of the welding wire 11 can be melted to maintain a welding state when the portion to be welded 31 is irradiated with the laser light.

Subsequently, the laser welding apparatus body 100 is subjected to a pre-weld traveling over the portion to be welded 31 in a non-welding state, for example, without the irradiation of the laser light. Here, the distance between the extremity of the laser irradiation head 1 and the portion to be welded 31 is determined by using the rotation sensor 25 or the like.

Based on the distance determined in the pre-weld traveling, the traveling operation optimum for the laser welding apparatus body 100 is calculated. More specifically, the moving route of the laser welding apparatus body 100 is corrected so that the distance can be kept within the weldable distances during traveling. Based on the traveling operation calculated, the laser welding apparatus body 100 performs welding while maintaining the distance optimum for welding in the direction of the laser optical axis. For example, if the portion to be welded 31 has pits and projections in the direction of the laser optical axis, the vertical drive unit is controlled so as to maintain the distance between the extremity of the laser irradiation head 1 and the portion to be welded 31 within the weldable range.

The laser welding apparatus body 100 is configured to perform welding while moving in the foregoing welding direction. When in a pre-weld traveling and in welding, the extremity of the welding wire 11 is in contact with the portion to be welded 31 with a predetermined pressing force while constantly maintaining a predetermined angle to the laser optical axis.

If the portion to be welded 31 is a flat surface, the laser welding apparatus body 100 moves along the flat surface. Here, the extremity of the welding wire 11 moves in contact with the portion to be welded 31 with a substantially constant pressing force.

Even if the portion to be welded 31 is an uneven surface with respect to the laser optical axis, the laser welding apparatus body 100 is configured to perform welding closely along the uneven portion to be welded 31 so that the distance between the extremity of the laser irradiation head 1 and the portion to be welded 31 is maintained within the weldable distances as with a flat surface.

If a difference in distance between the highest and lowest points of the uneven shape of the portion to be welded 31 with respect to the direction of the laser optical axis, i.e., the PV value of the uneven shape falls within the range of weldable distances, the laser welding apparatus body 100 can perform welding without tracing the uneven shape.

In such a case, the pressing force from the first elastic member 33 can make the extremity of the welding wire 11 reciprocate in the direction of the laser optical axis so as to follow the uneven shape and closely maintain contact with the portion to be welded 31 for welding. Such a control can be performed more easily than moving the laser welding apparatus body 100 itself.

The laser welding apparatus body 100 need not necessarily measure the surface configuration of the portion to be welded 31 by a pre-weld traveling in advance. For example, if the relationship between the distance from the extremity of the laser irradiation head 1 to the extremity of the welding wire 11 and the angle detected by the rotation sensor 25 is determined in advance, it is possible to measure the distance during welding. More specifically, based on the measurement of the distance, the laser welding apparatus body 100 can correct the distance between the extremity of the laser irradiation head 1 and the portion to be welded 31 while performing welding.

In such a case, if the distance between the extremity of the laser irradiation head 1 and the portion to be welded 31 is considered to be out of the weldable range, the extremity of the welding wire 11 is controlled to move in a direction away from the portion to be welded 31. Only the extremity of the welding wire 11 may be moved away from the portion to be welded 31. The laser welding apparatus body 100 itself may be moved away from the portion to be welded 31.

The extremity of the welding wire 11 may be moved away from the portion to be welded 31, before the distance between the extremity of the laser irradiation head 1 and the extremity of the welding wire 11 is measured again. Then, the laser welding apparatus body 100 may be moved to an optimum welding distance to resume welding.

The laser welding apparatus body 100 applies a jet of dry inert gas to the partitioning member 15, and can thus blow water off the partitioning member 15. Since the surface of the partitioning member 15 can be kept dry even in the water, the laser welding apparatus body 100 can perform welding in the water.

As can be seen from the foregoing description, according to the present embodiment, the laser welding apparatus can perform welding while maintaining the contact with the portion to be welded 31 even if the distance between the portion to be welded 31 and the extremity of the laser irradiation head 1 varies.

While the present embodiment has dealt with the apparatus configuration that is intended for underwater operation, the apparatus can also be operated in the air. For in-the-air operation, the outer frame 9 need not have the watertight structure.

Second Embodiment

Figure 2:
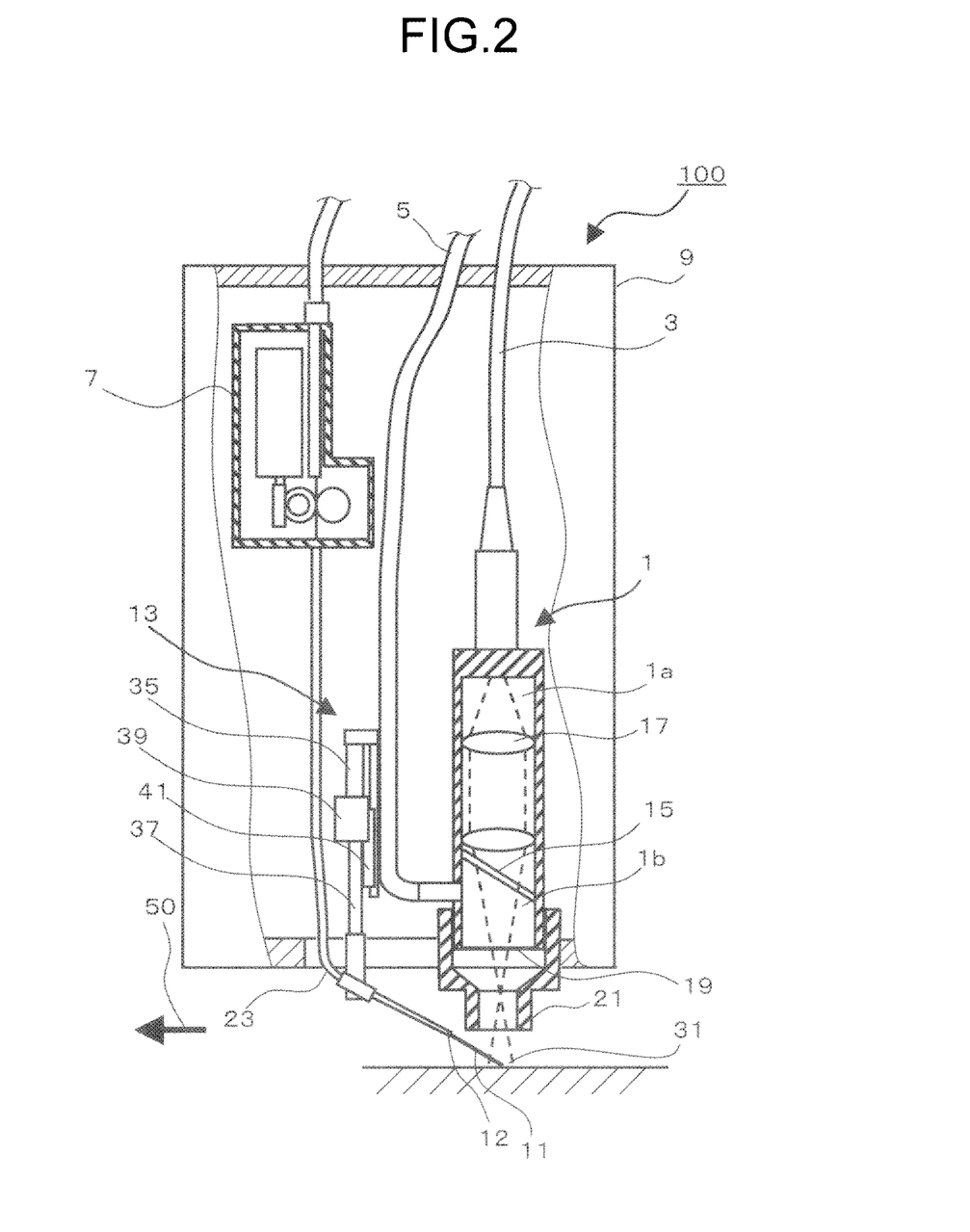
FIG. 2 is a partly-broken partial sectional front view showing a laser welding apparatus body of a second embodiment according the present invention.

A second embodiment of the laser welding apparatus according to the present invention will be described with reference to FIG. 2. FIG. 2 is a partly-broken partial sectional front view showing a laser welding apparatus body 100 according to the present embodiment. The present embodiment is a modification of the first embodiment. Parts identical or similar to those of the first embodiment will be designated by the same reference symbols, and redundant description will be omitted.

As shown in FIG. 2, the welding wire contract mechanism 13 according to the present embodiment includes: a second elastic member 35 that expands and contracts in the direction of the laser optical axis, such as a spring or rubber; a second support member 37 which extends in the direction of the laser optical axis from an end of the second elastic member 35 closer to the portion to be welded 31 and is coupled to the welding wire feed pipe 23 near the portion to be welded 31 to support the welding wire feed pipe 23; a slide shaft 39 which is configured so that the second support member 37 fluctuates in the direction of the laser optical axis; and a position sensor 41 which detects the displacement of the slide shaft 39 resulting from the fluctuation.

As in the first embodiment, the extremity of the welding wire 11, which is extended from the extremity of the welding wire feed pipe 23 to the portion to be welded 31, can be kept closely in contact with the portion to be welded 31 by a pressing force from the action of the second elastic member 35.

In the present embodiment, the second elastic member 35 expands and contracts in the direction of the laser optical axis. The pressing force of the extremity of the welding wire 11 therefore acts on the portion to be welded 31 in the direction of the laser optical axis.

In the first embodiment, the rotating operation of the extremity of the welding wire 11 is substituted for a fluctuation. The extremity of the welding wire 11, in strict terms, can thus slightly deviate from the laser optical axis.

In contrast, according to the present embodiment, the second support member 37 fluctuates in the direction of the laser optical axis. This allows the extremity of the welding wire 11 to fluctuate along the optical axis.

A variation in the distance between the extremity of the laser irradiation head 1 and the extremity of the welding wire 11 can be read from the position sensor 41. The distance can thus be measured by the pre-weld traveling more precisely than in the first embodiment.

Third Embodiment

Figure 3:
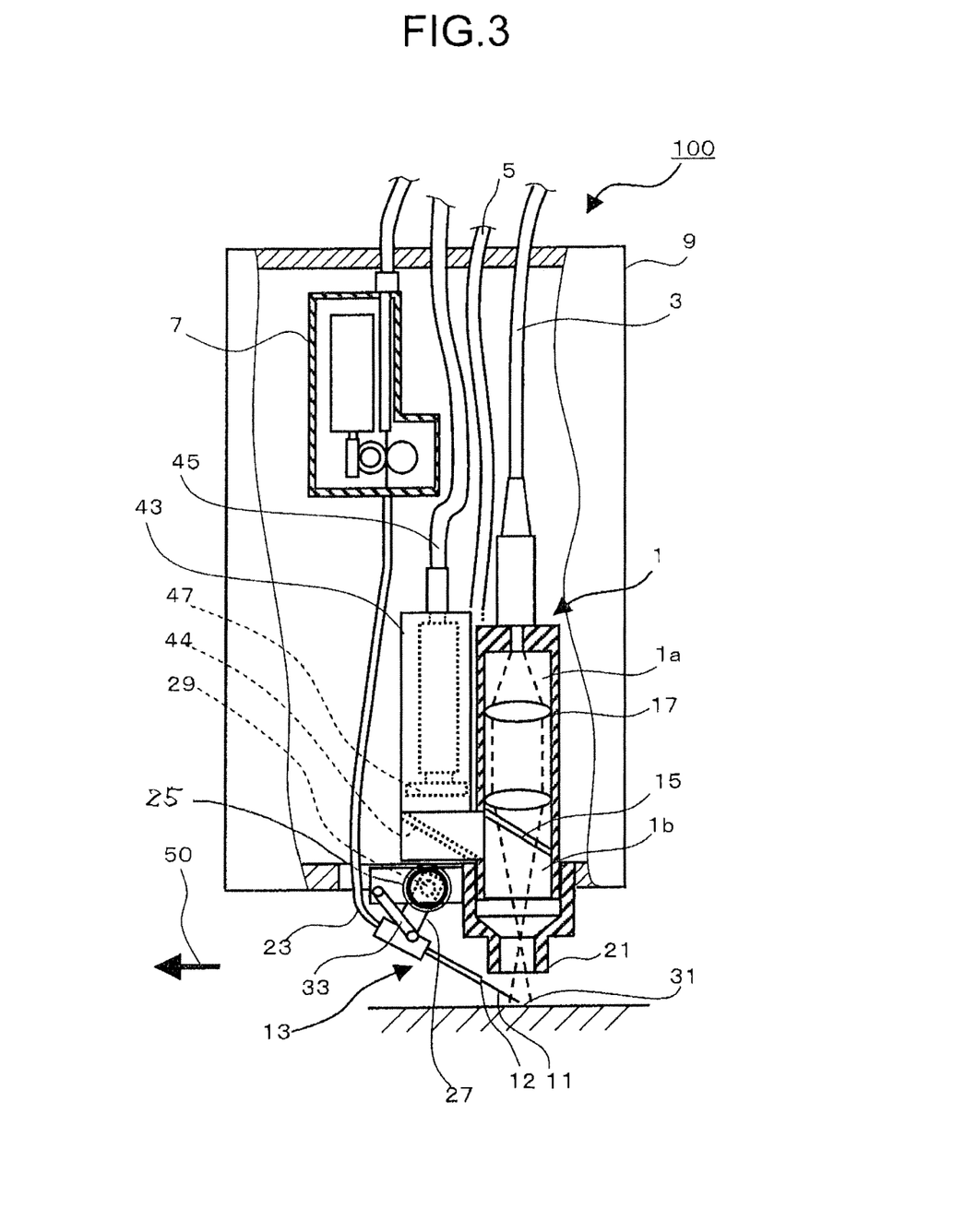
FIG. 3 is a partly-broken partial sectional front view showing a laser welding apparatus body of a third embodiment according the present invention.

A third embodiment of the laser welding apparatus according to the present invention will be described with reference to FIG. 3. FIG. 3 is a partly-broken partial sectional front view showing a laser welding apparatus body 100 according to the present embodiment. The present embodiment is a modification of the first embodiment. Parts identical or similar to those of the first embodiment will be designated by the same reference symbols, and redundant description will be omitted.

In the present embodiment, as shown in FIG. 3, a built-in camera 43 is attached to the vicinity of the laser irradiation head 1 in order to observe the portion to be welded 31. The partitioning member 15 of the laser irradiation head 1 is formed to reflect certain wavelengths of light, such as visible light, and transmit such light as infrared laser light for welding. An optical filter 47 and the like may be arranged on the optical path between the partitioning member 15 and the built-in camera 43.

The welding state of the portion to be welded 31 is initially reflected on the partitioning member 15 which is arranged in the laser irradiation head 1. The image appearing on the partitioning member 15 is reflected from the partitioning member 15 onto a reflector 44, and then captured by the built-in camera 43 through the optical filter 47. The image data captured by the built-in camera 43 is transmitted to, for example, an image processor (not shown) through a camera cable 45 which is connected to the built-in camera 43 and extended to outside the outer frame 9. The image processor performs analysis and makes a screen output or the like, from which the welding operator can examine the welding quality.

The built-in camera 43 is desirably set, so that it focuses on the portion to be welded 31, when the distance between the extremity of the laser irradiation head 1 and the portion to be welded 31 falls within the range of weldable distances.

As can be seen from the foregoing description, according to the present embodiment, it is possible to monitor the point of laser irradiation (the portion to be welded 31) in the same direction as the direction of laser irradiation. For example, this facilitates examining the state of welding beads, the molten state of the extremity of the welding wire 11, the state of the molten pool, etc., so that the welding state can easily be checked for abnormalities.

If, for example, the extremity of the welding wire 11 is away from the portion to be welded 31, out-of-focus image data on the extremity of the welding wire 11 is transmitted to the image processor or the like. Here, the welding wire feed mechanism 7 is controlled to feed the welding wire 11 so that the extremity of the welding wire 11 comes into focus. After the welding wire 11 is fed so that the extremity of the welding wire 11 comes into focus, it becomes a weldable state.

Based on the image of the built-in camera 43, the welding operator can easily check whether the extremity of the welding wire 11 is in a weldable position or not. If not in a weldable position, the welding operator can move the extremity of the welding wire 11 to that position easily.

The laser light typically used in the laser welding has an infrared wavelength. In a dim welding atmosphere or the like, it is sometimes difficult to obtain an image that is recognizable to the welding operator even if the portion to be welded 31 is observed by using the built-in camera 43.

In such a case, the laser irradiation head 1 may irradiate visible laser light having a wavelength in the visible region so as to be superposed on the laser light for welding. This can make the observation of the portion to be welded 31 easier.

Note that the visible laser light is intended to facilitate the observation of the portion to be welded 31, not to affect the welding steps such as a melting step.

Fourth Embodiment

Figure 4:
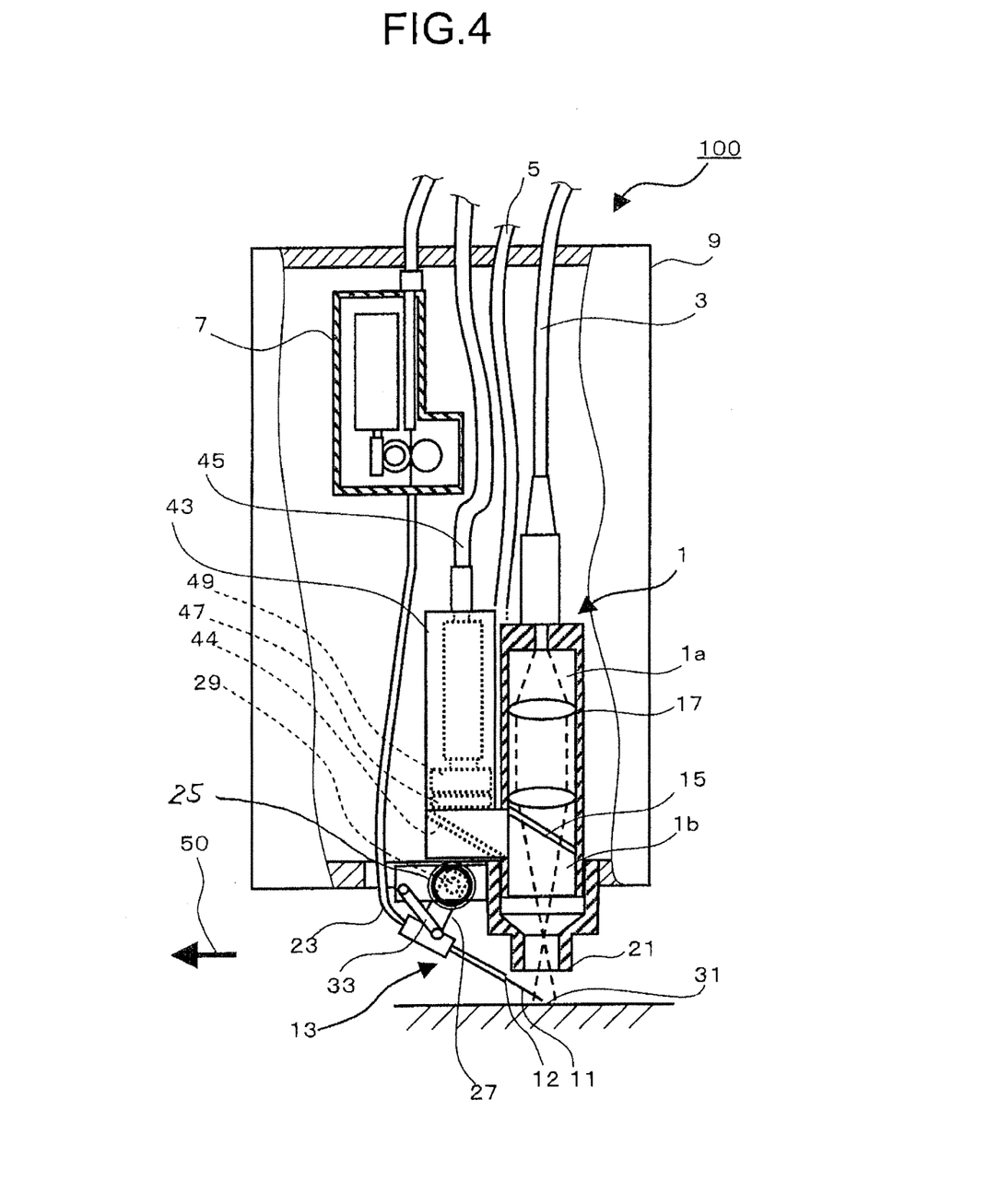
FIG. 4 is a partly-broken partial sectional front view showing a laser welding apparatus body of a fourth embodiment according the present invention.
Figure 5:
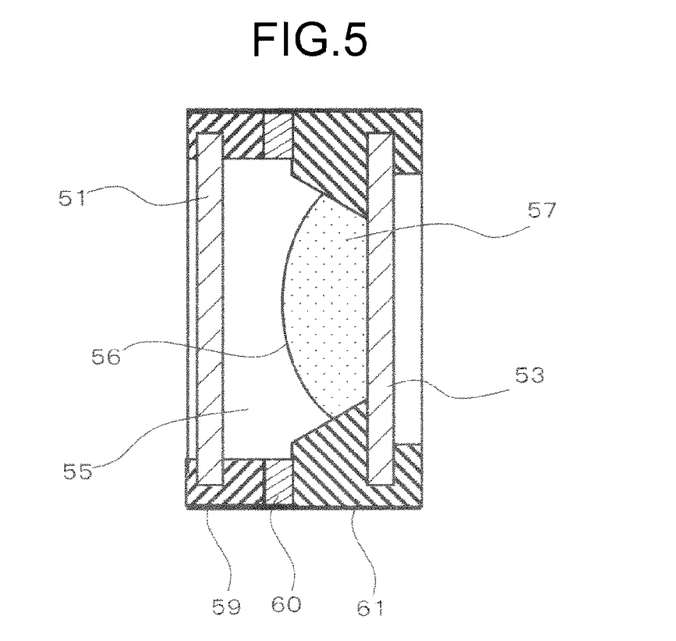
FIG. 5 is a schematic longitudinal sectional side view showing the configuration of a liquid lens.
Figure 6:
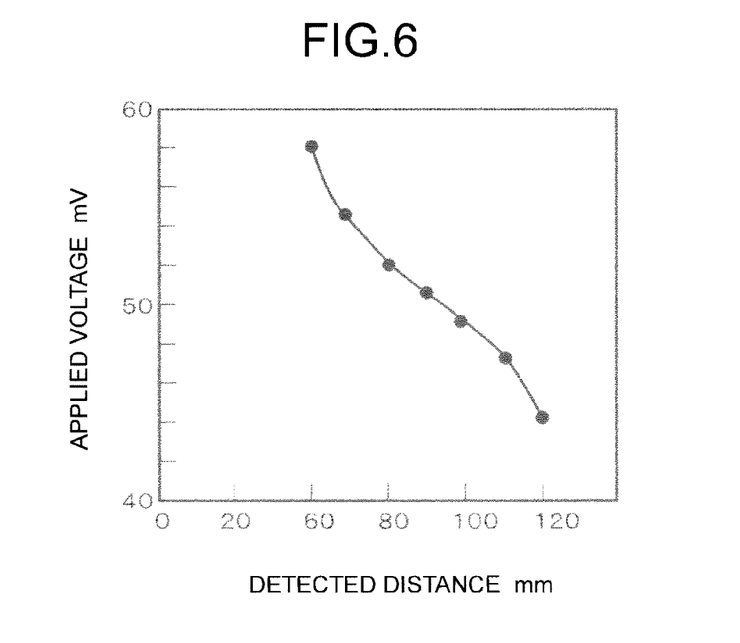
FIG. 6 is a graph showing the relationship between the voltage applied to the liquid lens and a detected distance.

A fourth embodiment of the laser welding apparatus according to the present invention will be described with reference to FIGS. 4 to 6. FIG. 4 is a partly-broken partial sectional front view showing a laser welding apparatus body 100 according to the present embodiment. FIG. 5 is a schematic longitudinal sectional side view showing the configuration of a liquid lens 49. FIG. 6 is a graph showing the relationship between the voltage applied to the liquid lens 49 and the distance of the focus of the liquid lens 49 detected (detected distance). The present embodiment is a modification of the third embodiment. Parts identical or similar to those of the third embodiment will be designated by the same reference symbols, and redundant description will be omitted.

In the present embodiment, a liquid lens 49 is arranged in the built-in camera 43. As shown in FIG. 5, the liquid lens 49 is composed of a cylindrical container, for example. A first transparent window 51 is formed in an end, and a second transparent window 53 is formed in the opposite end. An aqueous solution 55 and oil 57 are sealed in the container. A first electrode 59 and a second electrode 61 of, for example, ring shape are arranged in the axial direction of the cylinder on the outer periphery of the lateral side of the container. An insulator 60 is arranged between the electrodes.

The application of different voltages to the first electrode 59 and the second electrode 61 attracts the aqueous solution 55 to one of the electrodes—for example, the first electrode 59. The surface (interface 56) where the oil 57 and the aqueous solution 55 are in contact with each other accordingly changes in shape, which can change optical characteristics such as refractive index freely.

For example, as shown in FIG. 6, it is observed that the distance (detected distance) of the focus of the liquid lens 49 detected decreases with the increasing applied voltage. Such a characteristic can be used to measure the distance between the extremity of the laser irradiation head 1 and the extremity of the welding wire 11 based on the voltage applied to the liquid lens 49.

The focusing with the liquid lens 49 also eliminates the need for a complicated zooming mechanism. The built-in camera 43 can thus be reduced in number of parts and the like for a more simplified structure.

As has also been described in the third embodiment, visible laser light having a wavelength in the visible region may be irradiated so as to be superposed on the laser light for welding if in a dim welding atmosphere.

Fifth Embodiment

Figure 7:
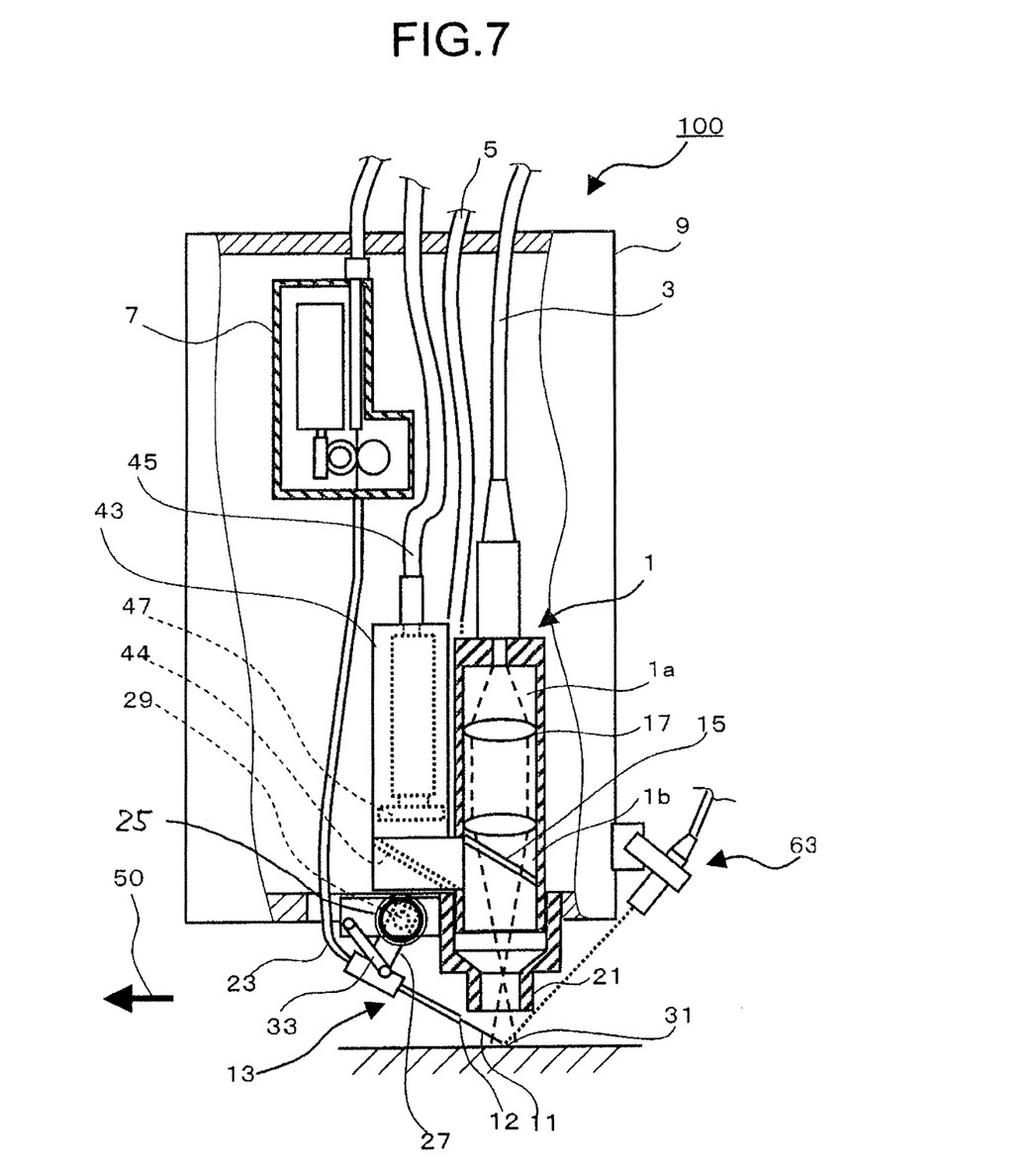
FIG. 7 is a partly-broken partial sectional front view showing a laser welding apparatus body of a fifth embodiment according the present invention.

A fifth embodiment of the laser welding apparatus according to the present invention will be described with reference to FIG. 7. FIG. 7 is a partly-broken partial sectional front view showing a laser welding apparatus body 100 according to the present embodiment. The present embodiment is a modification of the third embodiment. Parts identical or similar to those of the third embodiment will be designated by the same reference symbols, and redundant description will be omitted.

As shown in FIG. 7, a visible laser light irradiation unit 63 that irradiates laser light in a wavelength band of visible light region may be attached, for example, to the outer side of the outer frame 9 as a means for irradiating the portion to be welded 31 with visible laser light. The visible laser light irradiation unit 63 may be attached so that the visible laser light is irradiated from a direction different from the laser optical axis for welding.

According to the present embodiment, the focus of the visible laser light can be adjusted by a device different from the laser light irradiation unit for welding. This facilitates adjusting the visible laser light in intensity, focus, etc., as compared to the case of superposition with the laser light for welding as has been described in the third and fourth embodiments. It is therefore possible to shoot the portion to be welded 31 more clearly.

Sixth Embodiment

A sixth embodiment of the laser welding apparatus according to the present invention will be described with reference to FIGS. 8 to 14. The present embodiment is an example where the laser welding apparatus body 100 having the built-in camera 43 according to the third embodiment, for example, is combined with an image analysis system 89 and other components.

Figure 8:
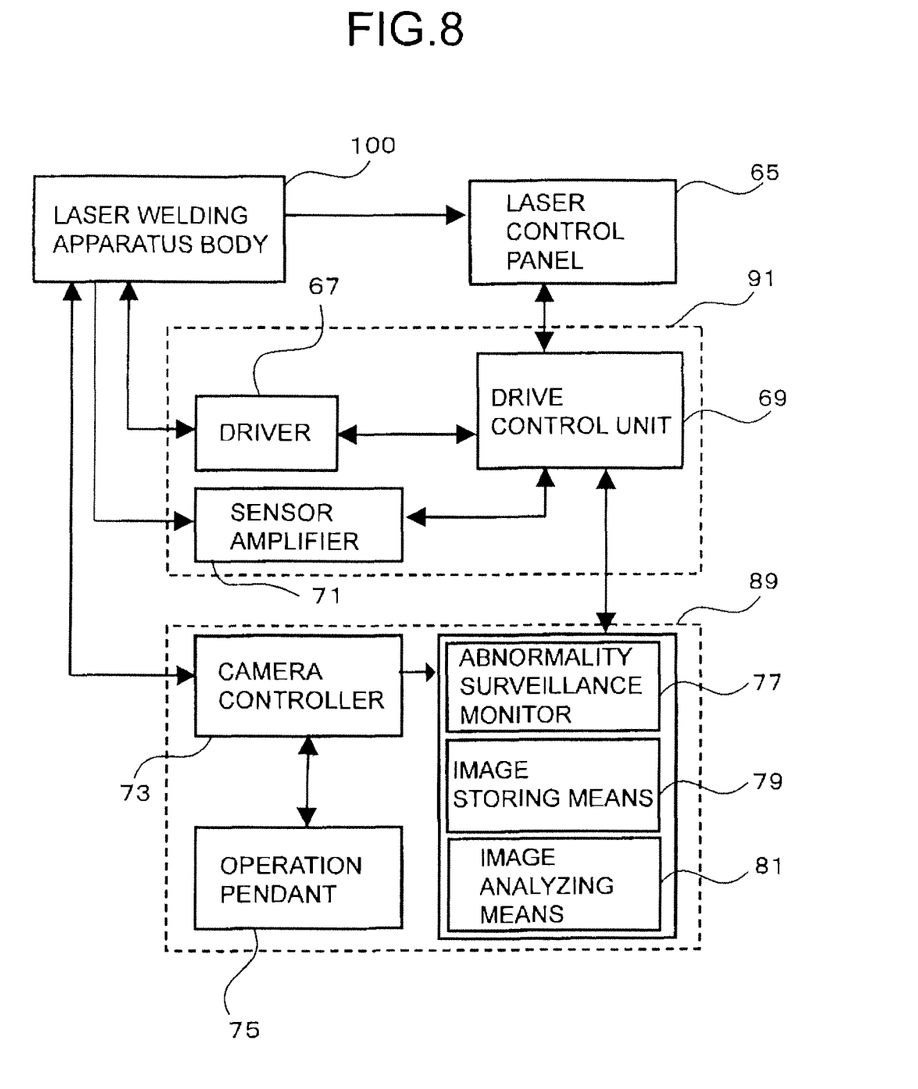
FIG. 8 is a block diagram showing the configuration of a sixth embodiment according to the present invention.

FIG. 8 is a block diagram showing the configuration of the laser welding apparatus according to the present embodiment. FIG. 8 shows an example of configuration that combines the laser welding apparatus body 100, a laser control panel 65 which exercises control on the laser light and the like, a drive system 91 which drives the laser welding apparatus body 100, and the image analysis system 89 which analyzes image data captured by the built-in camera 43. The laser welding apparatus body 100 has the same configuration as that of the third embodiment (FIG. 3), for example.

The drive system 91 of the laser welding apparatus body 100 includes a driver 67 and a drive control unit 69. The drive control unit acquires measurements from the rotation sensor 25 and the like through a sensor amplifier 71, and corrects the moving route of the laser welding apparatus body 100. After the correction of the moving route, The drive control unit transmits a command for driving the laser welding apparatus body 100 to the driver 67 and the like based on the result of correction. The laser welding apparatus body 100 is driven by the driver 67 and the like based on the drive command.

The image analysis system 89 includes a camera controller 71, an operation pendant 75, and an abnormality surveillance monitor 77. The camera controller 71 exercises control, for example, on the focusing operation and the like of the built-in camera 43 so that the image of the portion to be welded 31 comes into focus. Here, the operation pendant 75 and the like may be used for operation. The abnormality surveillance monitor 77 displays the image data captured by the built-in camera 43, an analyzed image, etc.

Aside from such components, the image analysis system 89 includes an image storing means 79 for storing the image data captured by the built-in camera 43, and an image analyzing means 81 for performing binarization processing and other analyses such as an RGB intensity analysis on the image data.

Figure 9:
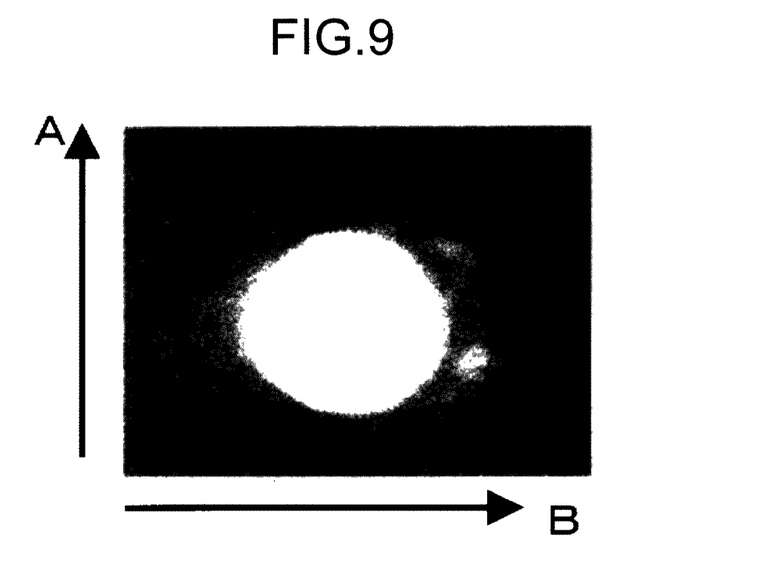
FIG. 9 is a diagram showing an example of an image that is captured by a built-in camera when welding is normally performed.
Figure 10:
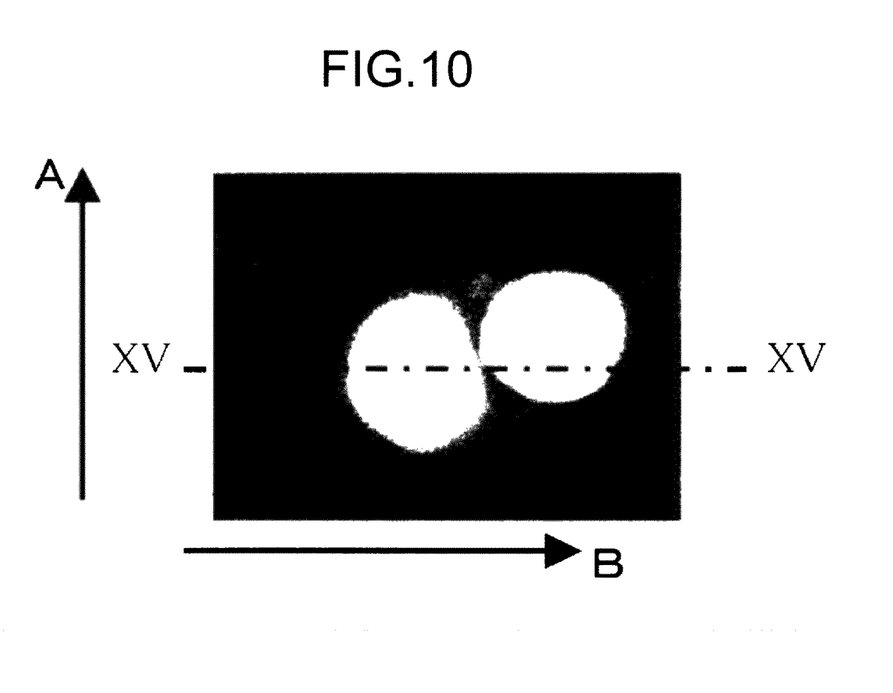
FIG. 10 is a diagram showing an example of an image that is captured by the built-in camera when welding is not normally performed.

FIG. 9 is a diagram showing an example of the image that is captured by the built-in camera when welding is normally performed. FIG. 10 is a diagram showing an example of the image when the welding point and the extremity of the welding wire 11 are away from each other, where welding is not normally performed.

Figure 11:
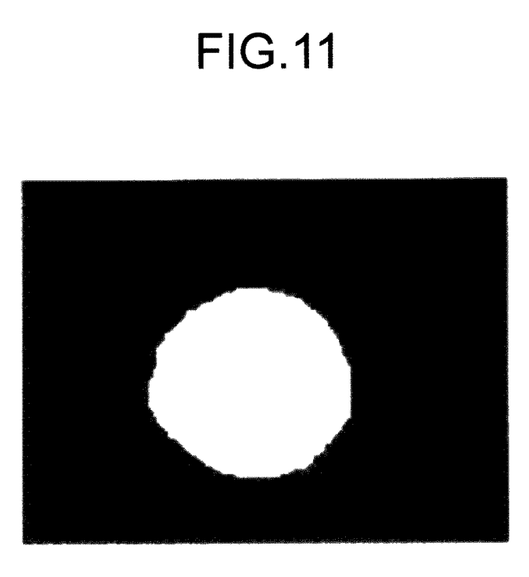
FIG. 11 is a diagram showing the image shown in FIG. 9, binarized by an image analyzing means.
Figure 12:
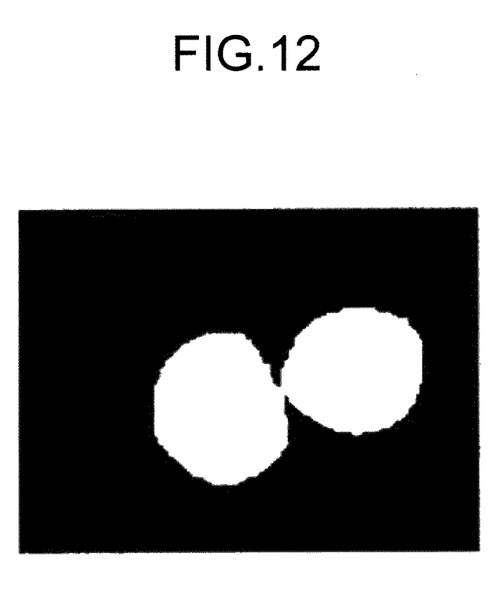
FIG. 12 is a diagram showing the image shown in FIG. 10, binarized by the image analyzing means.

FIG. 11 is a diagram showing the image shown in FIG. 9, binarized by the image analyzing means. FIG. 12 is a diagram showing the image of FIG. 10 similarly binarized.

For example, as shown in FIG. 9, the image captured by the built-in camera 43 shows the welding point and the extremity of the welding wire 11 generally in a single circle when welding is normally performed. As shown in FIG. 11, the binarized image shows the circular area clearly in white.

In contrast, as shown in FIG. 10, an area that indicates the welding point and an area that indicates the extremity of the welding wire 11 appear separately when the portion to be welded 31 and the extremity of the welding wire 11 are away from each other. The binarized image clearly shows the respective areas indicating the welding point and the extremity of the welding wire 11 in white.

As described above, the binarization processing on the image data captured from the built-in camera 43 facilitates checking the welding state for abnormalities.

The image analyzing means 81 can also analyze color image data captured from the built-in camera 43 for RGB intensities, thereby checking the welding state for abnormalities.

Figure 13:
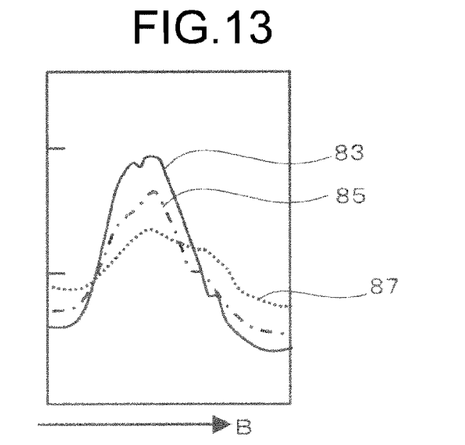
FIG. 13 is a graph showing the result of an RGB intensity analysis performed on the image of FIG. 9 by the image analyzing means.

FIG. 13 is a graph showing the result of an RGB intensity analysis on the image that shows the normal welding state shown in FIG. 9. The line 83 indicates a Red characteristic, the line 85 indicates a Green characteristic, and the line 87 indicates a Blue characteristic, each of which traces a single peak.

The image shown in FIG. 9 is divided into a plurality of blocks in the direction of the arrow A. In one of the blocks, the Red characteristic data is averaged. Averages in all the respective plurality of blocks are calculated similarly. The averages in the respective blocks are then plotted on a graph in the direction of the arrow B. The result is the Red characteristic of the image with respect to the direction of the arrow B. The same processing is performed on the Green and Blue.

Figure 14:
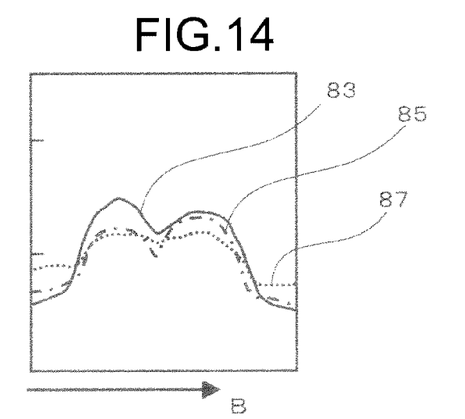
FIG. 14 is a graph showing the result of an RGB intensity analysis performed on the image of FIG. 10 by the image analyzing means.

FIG. 14 is a graph showing the result of an RGB intensity analysis on the image of FIG. 10. The method of analysis of FIG. 14 is the same as that of FIG. 13. As shown in FIG. 14, the line 83 indicating the Red characteristic, the line 85 indicating the Green characteristic, and the line 87 indicating the Blue characteristic trace two peaks each, unlike the result of analysis of the normal state shown in FIG. 13.

As described above, the RGB intensity analysis on the image data captured from the built-in camera 43 facilitates checking the welding state for abnormalities.

Other Embodiments

The foregoing embodiments have been described for illustrative purposes in explaining the present invention, and are not intended to limit the inventions set forth in the claims. The configuration of each part of the present invention is not limited to the foregoing embodiments, and various modifications may be made within the technical scope set forth in the claims.

Figure 15:
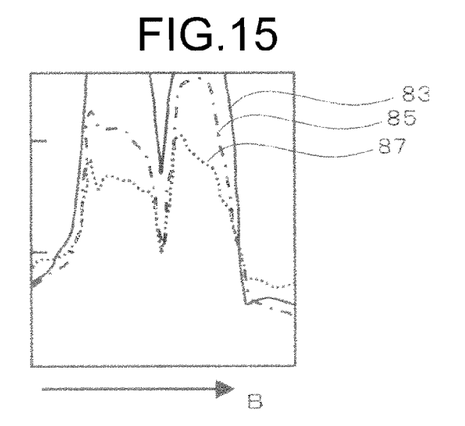
FIG. 15 is a graph showing the result of an RGB intensity analysis on each point on the line XV-XV of FIG. 10.

For example, in the sixth embodiment, the RGB intensity analysis is not limited to the foregoing method. FIG. 15 is a graph showing the result of an RGB intensity analysis on each point on the line XV-XV of FIG. 10. In this way, a characteristic area such as the line XV-XV of FIG. 10 may be extracted from the image captured from the built-in camera 43 for RGB intensity analysis.

The video signal from the built-in camera 43 has odd-numbered fields and even-numbered fields. The data on both the fields is typically input to an image display unit such as the abnormality surveillance monitor 77 for image display. The data on the odd-numbered fields and the data on the even-numbered fields may be alternately input to the abnormality surveillance monitor 77 or the like to perform an image display at double rate.

What is claimed is:

1. A laser welding apparatus comprising:
   an outer frame;
   a laser irradiation head of tubular shape that is arranged in the outer frame and is divided inside into a light source side and an irradiation side by a partitioning member having a light transparency and reflectivity, an opening being formed in an extremity of the irradiation side, an optical member for collecting laser light being arranged on the light source side, the irradiation side being intended for irradiation of the laser light;
   a gas supply pipe that is coupled to a lateral side of the irradiation side to supply inert gas into an interior of the irradiation side;
   a gas jet nozzle that is coupled in series to the opening in the extremity of the irradiation side, and is formed so as to irradiate a portion to be welded with the laser light and jet the inert gas to the portion to be welded;
   a welding wire feed pipe that sequentially feeds a welding wire so that an extremity of the welding wire comes into contact with the portion to be welded; and
   a welding wire contact mechanism that includes a measuring means for measuring an angle of rotation of the welding wire fed from the welding wire feed pipe, such that the welding wire contact mechanism is capable of measuring a distance between the extremity of the irradiation side and the extremity of the welding wire, and is formed so that the extremity of the welding wire is brought into contact with and pressed against the portion to be welded by an elastic member.

2. The laser welding apparatus according to claim 1, wherein
   the welding wire contact mechanism includes:
   a rotating shaft that is arranged near the gas jet nozzle,
   a rotation sensor that detects an angle of rotation of the rotating shaft; and
   a first support member that is formed so that one of its ends is coupled to the rotating shaft and another end supports the welding wire feed pipe near the portion to be welded, and
   the elastic member is formed to couple the outer frame near the gas jet nozzle to the first support member; and
   an angle of rotation of the extremity of the welding wire is detected by the rotation sensor, and a distance between the extremity of the irradiation side and the portion to be welded is derived from result of the detection.

3. The laser welding apparatus according to claim 1, wherein
the outer frame is formed so as to prevent intrusion of water inside; and
the gas supply pipe is formed to supply the inert gas into the interior of the irradiation side, whereby water is blocked out to maintain an optical path of laser in the laser irradiation head in a gas phase.

4. The laser welding apparatus according to claim 1, comprising:
a built-in camera that is arranged in the outer frame near the laser irradiation head, and is formed to shoot the portion to be welded;
image analyzing means for analyzing an image shot by the built-in camera; and
image output means for outputting image data processed by the image analyzing means.

5. The laser welding apparatus according to claim 4, wherein the built-in camera includes a liquid lens and is formed to focus on the portion to be welded by using the liquid lens, the liquid lens being formed to change in an optical characteristic according to an applied voltage.

6. The laser welding apparatus according to claim 4, wherein the measuring means is configured so as to be capable of measuring a distance between the extremity of the irradiation side and the portion to be welded based on a focus of the image shot by the built-in camera.

7. The laser welding apparatus according to claim 4, wherein the laser irradiation head includes means for irradiating visible laser light having a wavelength band in a visible light region so that the visible laser light is superposed on the optical axis of the laser light for welding.

8. The laser welding apparatus according to claim 4, comprising visible laser light irradiation means configured to irradiate the portion to be welded with the visible laser light from a direction that forms a predetermined angle to the optical axis of the laser light for welding.

9. The laser welding apparatus according to claim 4, wherein the image analyzing means is configured to perform binarization processing on the image of the portion to be welded shot by the built-in camera.

10. The laser welding apparatus according to claim 4, wherein the image analyzing means is configured to analyze the image of the portion to be welded shot by the built-in camera for RGB intensities.

11. A laser welding apparatus comprising:
a laser irradiation head of tubular shape that is arranged in the outer frame and is divided inside into a light source side and an irradiation side by a partitioning member having a light transparency and reflectivity, an opening being formed in an extremity of the irradiation side, an optical member for collecting laser light being arranged on the light source side, the irradiation side being intended for irradiation of the laser light;
a gas supply pipe that is coupled to a lateral side of the irradiation side to supply inert gas into an interior of the irradiation side;
a gas jet nozzle that is coupled in series to the opening in the extremity of the irradiation side, and is formed so as to irradiate a portion to be welded with the laser light and jet the inert gas to the portion to be welded;
a welding wire feed pipe that sequentially feeds a welding wire so that an extremity of the welding wire comes into contact with the portion to be welded; and
a welding wire contact mechanism that includes a measuring means for measuring an angle of rotation of the welding wire fed from the welding wire feed pipe, such that the welding wire contact mechanism is capable of measuring a distance between the extremity of the irradiation side and the extremity of the welding wire, and is formed so that the extremity of the welding wire is brought into contact with and pressed against the portion to be welded by an elastic member,
wherein the elastic member is formed to expand and contract in a direction of an optical axis of the laser light; and
wherein the welding wire contact mechanism comprises:
a second support member that is formed to extend in the direction of the optical axis from an end of the elastic member closer to the portion to be welded and support the welding wire feed pipe near the portion to be welded,
a slide shaft that is configured so that the second support member is capable of fluctuating in the direction of the optical axis, and
a position sensor that detects a displacement of the slide shaft resulting from the fluctuation.

* * * * *